United States Patent
Cheng et al.

(10) Patent No.: US 12,538,976 B2
(45) Date of Patent: Feb. 3, 2026

(54) METHODS, SYSTEMS, AND APPARATUSES FOR DETACHABLY MOUNTING WEARABLE DEVICES

(71) Applicant: Hand Held Products, Inc., Charlotte, NC (US)

(72) Inventors: Hongkun Cheng, Charlotte, NC (US); Shuhua Jing, Charlotte, NC (US); Biao Di, Charlotte, NC (US); Hardik Yomesh Jani, Charlotte, NC (US)

(73) Assignee: Hand Held Products, Inc., Charlotte, NC (US)

( * ) Notice: Subject to any disclaimer, the term of this patent is extended or adjusted under 35 U.S.C. 154(b) by 107 days.

(21) Appl. No.: 18/496,221

(22) Filed: Oct. 27, 2023

(65) Prior Publication Data
US 2024/0156242 A1 May 16, 2024

(30) Foreign Application Priority Data
Nov. 15, 2022 (CN) .......................... 202211425225.2

(51) Int. Cl.
*A45F 5/00* (2006.01)
(52) U.S. Cl.
CPC .............. *A45F 5/00* (2013.01); *A45F 5/1525* (2025.01)
(58) Field of Classification Search
CPC .............................. A45F 5/1516; A45F 5/1525
(Continued)

(56) References Cited

U.S. PATENT DOCUMENTS

| 2,906,280 A | 9/1959 | Mount |
| 4,640,151 A * | 2/1987 | Howell .................. B62M 3/086 36/131 |

(Continued)

FOREIGN PATENT DOCUMENTS

CN 114761904 A 7/2022

OTHER PUBLICATIONS

Extended European Search Report Mailed on Apr. 8, 2024 for EP Application No. 23203184, 8 page(s).
(Continued)

*Primary Examiner* — Nathan J Newhouse
(74) *Attorney, Agent, or Firm* — Alston & Bird LLP

(57) ABSTRACT

Various embodiments are directed to mounting apparatuses, wearable device mounting systems, and methods of using the same. In various embodiments, a mounting apparatus for securing a wearable device may comprise: an attachment assembly configured to operably engage the wearable device to secure the wearable device in a detachable configuration relative to the mounting apparatus, the attachment assembly comprising: a first attachment mechanism comprising a dynamic protrusion element configured to operably engage a first portion of the wearable device, the first attachment mechanism being configured to facilitate a detachment of the wearable device from the attachment assembly upon a separation force that is greater than or equal to a threshold breakaway force being applied to the dynamic protrusion element; wherein the first attachment mechanism is selectively configurable between a first configuration and a second configuration to facilitate a selective adjustment of the threshold breakaway force defined by the first attachment mechanism.

18 Claims, 7 Drawing Sheets

(58) Field of Classification Search
USPC ....... 224/269, 669, 270, 219, 222, 665, 667;
248/222.11, 222.12, 510, 346.04;
403/328; 24/685, 642, 635, 628, 625,
24/613
See application file for complete search history.

(56) References Cited

U.S. PATENT DOCUMENTS

| | | | |
|---|---|---|---|
| 5,697,480 | A | 12/1997 | Herbermann et al. |
| 5,771,843 | A * | 6/1998 | Karlin ................. A01K 1/06 24/635 |
| 6,029,940 | A * | 2/2000 | Klein ................. H05K 5/0204 248/500 |
| 7,252,533 | B1 | 8/2007 | Lee |
| 9,571,147 | B1 * | 2/2017 | Chang ................. A45F 5/00 |
| 9,693,622 | B1 * | 7/2017 | Hackett ................. H04B 1/385 |
| 2008/0139038 | A1 | 6/2008 | Lee |
| 2013/0032617 | A1 | 2/2013 | Adelman et al. |
| 2014/0357331 | A1 * | 12/2014 | Pierson ................. A45C 13/18 455/575.8 |
| 2017/0335874 | A1 * | 11/2017 | Bausch ................. F16B 21/073 |
| 2019/0081508 | A1 * | 3/2019 | Laird ................. H02J 50/10 |
| 2021/0153631 | A1 * | 5/2021 | Choi ................. G06K 7/1413 |

OTHER PUBLICATIONS

Communication about intention to grant a European patent Mailed on Jul. 9, 2025 for EP Application No. 23203184, 6 page(s).
Decision to grant a European patent Mailed on Nov. 6, 2025 for EP Application No. 23203184, 2 page(s).

* cited by examiner

METHODS, SYSTEMS, AND APPARATUSES FOR DETACHABLY MOUNTING WEARABLE DEVICES

CROSS-REFERENCE TO RELATED APPLICATIONS

This application claims priority pursuant to 35 U.S.C. 119(a) to Chinese Application No. 202211425225.2, filed Nov. 15, 2022, which application is incorporated herein by reference in its entirety.

FIELD OF THE INVENTION

The present disclosure relates generally to wearable devices. In particular, it relates to mounts for wearable devices for use in industrial, logistics, and warehouse applications.

BACKGROUND

In modern production environments, such as warehouses and industrial locations, it is increasingly desirable for human operators to be able to wear portable electronic devices for easy access. This is also desirable for other jobs, such as parcel delivery, and for other use cases, such as hobby and recreational environments.

Wearable devices may, for example, be attached on to the wearable mount that is attached to the wrist, hand, or forearm of a user. Latching operations may be carried out multiple times in a work shift (e.g., during breaks or battery replacement). Some applications require undesirably rigid mounting means that require at least partial failure, deformation, and/or the like for a wearable device to be detached from a mounting apparatus without proactive user intervention. Through applied effort, ingenuity, and innovation, Applicant has solved problems relating to ergonomic latching and release of wearable devices by developing solutions embodied in the present disclosure, which are described in detail below.

BRIEF SUMMARY

Various embodiments are directed to mounting apparatuses, wearable device mounting systems, and methods of using the same. In various embodiments, a mounting apparatus for securing a wearable device may comprise: an attachment assembly configured to operably engage the wearable device to secure the wearable device in a detachable configuration relative to the mounting apparatus, the attachment assembly comprising: a first attachment mechanism comprising a dynamic protrusion element configured to operably engage a first portion of the wearable device, the first attachment mechanism being configured to facilitate a detachment of the wearable device from the attachment assembly upon a separation force that is greater than or equal to a threshold breakaway force being applied to the dynamic protrusion element; wherein the first attachment mechanism is selectively configurable between a first configuration and a second configuration to facilitate a selective adjustment of the threshold breakaway force defined by the first attachment mechanism. In various embodiments, the dynamic protrusion element may define a dynamic configuration defined being laterally moveable between a locked position and a release position based at least in part on one or more forces acting on the dynamic protrusion element via the wearable device. In various embodiments, the first attachment mechanism may further comprise a spring element, a knockout plate, and a cam element, the spring element being arranged between the dynamic protrusion element and the knockout plate such that the spring element is configured to apply a variable spring force to the dynamic protrusion element in a first lateral direction at least substantially away from the knockout plate. In certain embodiments, the variable spring force applied to dynamic protrusion element by the spring element may embody a bias spring force configured to bias the dynamic protrusion element in the first lateral direction, wherein the first lateral direction defines an outward lateral direction such that, upon the wearable device being secured to the mounting apparatus, the dynamic protrusion element is biased towards the first portion of the wearable device; and wherein the threshold breakaway force is defined at least in part by the variable spring force being imparted on the dynamic protrusion element.

In various embodiments, the first attachment mechanism may be selectively configurable between at least three configurations corresponding to the threshold breakaway force defined by the first attachment mechanism being selectively adjustable between at least three predetermined threshold breakaway forces. In certain embodiments, the first attachment mechanism being selectively configurable between the at least three configurations may be defined by the cam element being configurable at least between a first cam position, a second cam position, and a third cam position.

In various embodiments, the first attachment assembly may be configured such that the variable spring force varies based at least in part on a cam position defined by the cam element. In various embodiments, the cam element may be configured for rotation about a central axis thereof such that the cam position of the cam element is defined by angular position relative to the central axis. In various embodiments, the cam element may comprise an at least partially rounded outer perimeter defined by an asymmetrical shape as measured over one or more perpendicular axes spanning opposing ends of the cam element such that a rotation of the cam element between a first cam position and a second cam position corresponds a changed in a lateral dimension defined by the cam element. In certain embodiments, the lateral dimension may be defined in the first lateral direction between the innermost lateral end of the knockout plate and an innermost edge of a cam element seat within which the cam element is secured.

In various embodiments, the mounting apparatus may further comprise a second attachment mechanism configured to operably engage a second portion of the wearable device. In certain embodiments, the attachment assembly may be configured such that the detachable configuration of the wearable device relative to the mounting apparatus facilitates the detachment being defined by one or more of a breakaway detachment defined the dynamic protrusion element of the first attachment mechanism being rearranged from a locked position to a release position based at least in part on one or more forces acting on the dynamic protrusion element via the wearable device and a user-initiated detachment defined by a user actuation of a release button defined by the second attachment mechanism. In various embodiments, the mounting apparatus may further comprise a plurality of fasteners configured to form a plurality of operable attachment points configured to engage a strap. In various embodiments, the dynamic protrusion element may comprise an at least partially curved apparatus surface, and wherein the first portion of the wearable device is defined at least in part by a corresponding curved device surface having a curvature that corresponds to the curved apparatus surface. In certain embodiments, the at least partially curved apparatus surface may be arranged so as to face in an at least partially outward lateral direction.

Various embodiments are directed to a wearable device mounting system, the wearable system comprising: a wearable device comprising a receptor and an orifice defined by one or more guide surfaces; a mounting apparatus for securing the wearable device, the mounting apparatus comprising: an attachment assembly configured to operably engage the wearable device to secure the wearable device in a detachable configuration relative to the mounting apparatus, the attachment assembly comprising: a first attachment mechanism comprising a dynamic protrusion element configured to operably engage at least a portion of the one or more guide surfaces defined by the wearable device, the first attachment mechanism being configured to facilitate a detachment of the wearable device from the attachment assembly upon a separation force that is greater than or equal to a threshold breakaway force being applied to the dynamic protrusion element; wherein the first attachment mechanism is selectively configurable between a first configuration and a second configuration to facilitate a selective adjustment of the threshold breakaway force defined by the first attachment mechanism.

In various embodiments, the dynamic protrusion element may define a dynamic configuration defined being laterally moveable between a locked position and a release position based at least in part on one or more forces acting on the dynamic protrusion element via the wearable device. In various embodiments, the first attachment mechanism may further comprise a spring element, a knockout plate, and a cam element, the spring element being arranged between the dynamic protrusion element and the knockout plate such that the spring element is configured to apply a variable spring force to the dynamic protrusion element in a first lateral direction at least substantially away from the knockout plate. In certain embodiments, the variable spring force applied to dynamic protrusion element by the spring element may embody a bias spring force configured to bias the dynamic protrusion element in the first lateral direction, wherein the first lateral direction defines an outward lateral direction such that, upon the wearable device being secured to the mounting apparatus, the dynamic protrusion element is biased towards the first portion of the wearable device; and wherein the threshold breakaway force is defined at least in part by the variable spring force being imparted on the dynamic protrusion element.

The above summary is provided merely for purposes of summarizing some example embodiments to provide a basic understanding of some embodiments of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE DRAWINGS

Reference will now be made to the accompanying drawings, which are not necessarily drawn to scale, and wherein.

DETAILED DESCRIPTION

Figure 1:
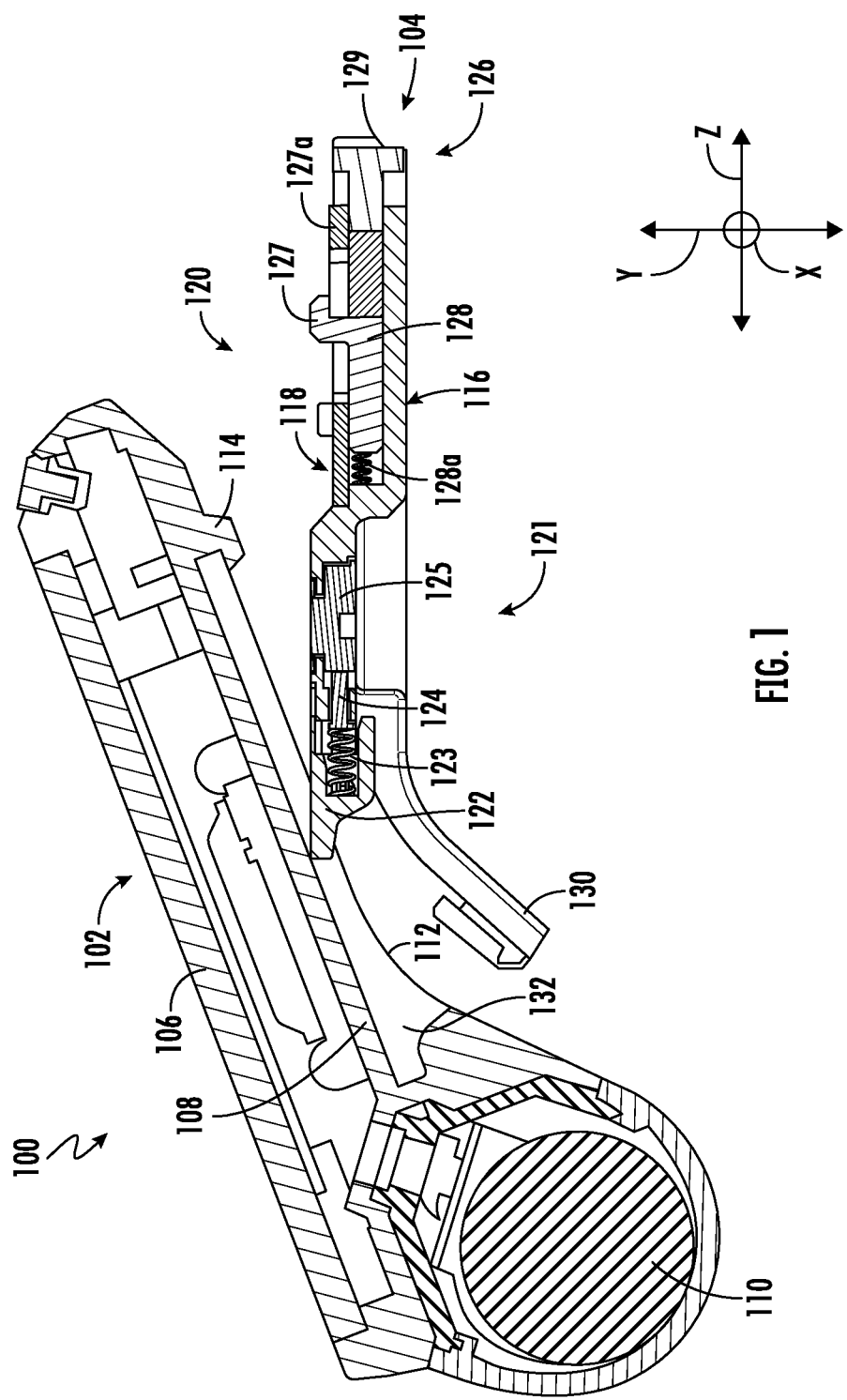
FIG. 1 is a first side cross-sectional view of an example wearable device mounting system with an attachment assembly having a dynamic protrusion element in accordance with various embodiments of the present disclosure.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

Many individuals employed in a variety of occupations and other users operating in nearly any environment where their hands must be available for use may be attach and un-attaching wearable devices to a wearable mounting apparatus multiple times throughout the workday. Wearable device mounting systems may be limited to a user-initiated detachment enabled by the actuation of a release button or any other proactive disengagement means. Additionally, various wearable device mounting systems may include an overly rigid breakaway functionality that is limited by the material strength characteristics (e.g., tensile strength) of the mounting apparatus and results in at an least partial apparatus deformation and/or failure that prevents subsequent attachments of the mounting apparatus and/or the wearable device. Typical examples include workers in warehouses and other industrial centers. However, a similar requirement may apply to parcel deliverers or any other user desiring a handsfree operation of a wearable device. It will be understood that many other workers and users may have such requirements.

Various embodiments of the present disclosure are directed to a mounting apparatus configured to detachably secure a wearable device thereto in an installed position using an attachment assembly that enables the wearable device to be detached from the mounting apparatus without user interaction therewith in an instance wherein an impact results in a sufficiently large breakaway force pulling the wearable device away from the attachment assembly. For example, various embodiments are directed to a mounting apparatus comprising an attachment assembly configured to operably engage the wearable device to secure the wearable device in a detachable configuration relative to the mounting apparatus using a first attachment mechanism comprising a dynamic protrusion element configured to operably engage the wearable device and move from a locked position to a release position to enable a breakaway detachment of the wearable device from the mounting apparatus upon a separation force greater than or equal to a threshold breakaway force being applied to the dynamic protrusion element.

Various embodiments are described below that attempt to facilitate the passive (e.g., without proactive user-interaction) detachment of example wearable devices from example mounting apparatuses upon one or both components experiencing a sufficient impact, including but not limited to a spring-loaded dynamic protrusion element configurable between a locked position and a release position in response to a threshold breakaway force counteracting the bias spring force of a spring element engaged therewith. Further, various embodiments described below provide a customizable configuration wherein the threshold breakaway force required to sufficiently separate a wearable device provided in an installed position from an attachment assembly of a mounting apparatus may be selectively adjusted by a user, thereby enabling a more bespoke operation of the mounting apparatus to accommodate user preference and/or industry requirements. Unless expressly stated otherwise or unless physically incompatible, the various features of the various embodiments herein may be combined individually or in any sub-combination or combination of features.

Figure 2:
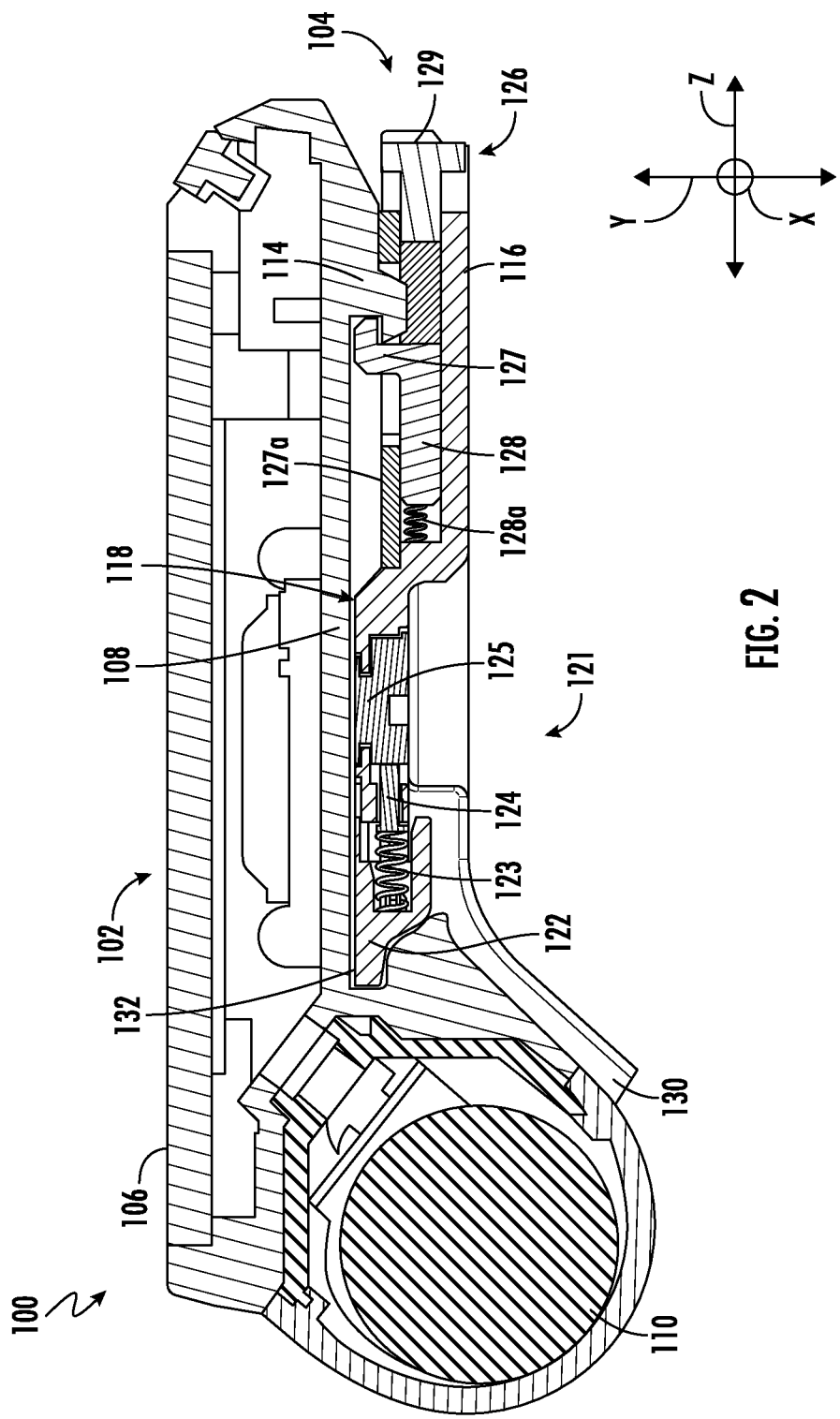
FIG. 2 is a second side cross-sectional view of an example wearable device mounting system with an attachment assembly having a dynamic protrusion element in accordance with various embodiments of the present disclosure.

According to some embodiments, and as shown in at least FIGS. 1-2, a wearable device mounting system 100 may include a wearable device 102 and a mounting apparatus 104. In some embodiments, the wearable device 102 may be a computer, cellular phone, tablet, personal digital assistant (PDA), or any other electronic device capable of being carried by a user. In some embodiments, the mounting apparatus 104 may be secured to a user or another attachment structure via a strap (not shown) or another mechanism capable of securely attaching to a structure (e.g., a user's arm or another body part or inanimate structure). In some embodiments, the strap may be an integral part of the mounting apparatus or a separately attached component. In various embodiments, other mounting hardware (e.g., plates, screws, stands, or the like) may be used. As shown in FIGS. 1-2, according to various embodiments, the wearable device 102 may be removably attached to the mounting apparatus 104 for securing the wearable device 102 during operation while facilitating intuitive and efficient removal when necessary. Reference is made below to the examples shown in FIGS. 1-2. However, it will be understood that a wearable device mounting system making use of a mounting apparatus having an attachment mechanism comprising a dynamic protrusion element configured to facilitate a breakaway functionality of a wearable mobile device installed at the mounting apparatus is not limited to the examples described below or shown in FIGS. 1-2.

FIGS. 1 and 2 show side views of an example wearable device mounting system 100. In particular, FIGS. 1 and 2 illustrate an exemplary wearable device mounting system 100 defined by a wearable device 102 provided in an detached configuration and an installed configuration, respectively, relative to a mounting apparatus 104.

FIG. 1 shows the wearable device 102 disconnected from the mounting apparatus 104, according to some embodiments. In some embodiments, the wearable device 102 may have a top surface 106 and a bottom surface 108. In some embodiments, the top and bottom surfaces 106, 108 may be substantially flat. In other embodiments, the top and bottom surface 106, 108 may have an at least partially curved shape. In some embodiments, the wearable device 102 may also have a battery pack 110, which in some embodiments may be detachable from the wearable device 102. The battery pack 110 may be disposed at one extreme side of the wearable device (e.g., as shown in FIG. 1), with the guide surface 112 being shown disposed between the battery pack 110 and the receptor 114.

In some embodiments, the wearable device 102 may also have a guide surface 112 defined on its bottom surface 108. In some embodiments, the guide surface 112 may be configured to connect or "lock in" the wearable device 102 onto the mounting apparatus 104 as well as to guide the wearable device 102 into this connected or locked-in state. In some embodiments, the guide surface 112 may define an orifice 132. In some embodiments, the orifice 132 may be configured to receive at least a portion of the attachment assembly 120 of the mounting apparatus 104, such as, for example, (e.g., the dynamic protrusion element 122 defined by the first attachment mechanism 121. For example, as illustrated in FIGS. 1 and 2, an exemplary wearable device 102 may have an orifice 132 defining an open side and five closed sides such that a dynamic protrusion element 122 having a spring-loaded configuration may be at least partially received within the orifice 132 and biased by the spring element 123 in a direction towards at least a portion of the one or more closed sides (e.g., an angled backside of the orifice 132 defined on the left side thereof, as illustrated in the exemplary orientation illustrated in FIG. 2). In various embodiments, an exemplary wearable device 102 may be connected to a mounting apparatus 104 (e.g., an attachment assembly 120) in an installed position based at least in part on an engagement of the dynamic protrusion element 122 defined by a first attachment mechanism 121 with and/or within the orifice 132 defined by the wearable device 102.

In various embodiments, the orifice 132 may be configured such that, upon the wearable device 102 being provided in an installed position relative to the attachment assembly 120 of the mounting apparatus 104, one or more of the surfaces defining the orifice 132 may engage, such as, for example, physically abut, at least a portion of the dynamic protrusion element 122 to prevent a relative movement (e.g., a relative vertical movement) between the dynamic protrusion element 122 and the wearable device 102 in an instance in which the latching mechanism and receptor (discussed herein) are also engaged to prevent the dynamic protrusion element 122 from being removed from the orifice 132 (e.g., without sufficient breakaway force). For example, the orifice 132 may be defined by an at least partially curved surface configured to engage a corresponding curved surface defined by the dynamic protrusion element 122 such that, upon a threshold breakaway force pulling the wearable service 102 in a separation direction, as described herein, the corresponding curvatures of the engaged curved surfaces of the dynamic protrusion element 122 and the orifice 132 cause the dynamic protrusion element to be moved laterally from the locked position to a release position such that the curved surfaces can move vertically relative one another in an at least partially vertical direction.

In some embodiments, the wearable device 102 may have a receptor 114 attached to and/or integrated with its bottom surface 108. In some embodiments, the receptor 114 may be configured to make an operable connection to the mounting apparatus 104, such as, for example, via a second attachment mechanism 126. In some embodiments, the receptor 114 may be, for example, a peg, as shown in at least FIGS. 1-2. However, the receptor 114 may, for example, be any shape or component configured to make an operable connection to the mounting apparatus 104; for example, in some embodiments, the receptor 114 may be an orifice, opening, recess, ledge, or other feature defined in the bottom surface 108 capable of preventing the wearable device 102 from lifting vertically off the top surface 108 of the mounting apparatus 104 in an instance in which the first attachment mechanism 121 (e.g., the dynamic protrusion element 122) and the second attachment mechanism 126 (e.g., the latch 127) are engaged with the wearable device 102. As described in further detail herein, the guide surface 112 and the first attachment mechanism 121 (e.g., the dynamic protrusion element 122) may engage from, at least, a first direction (e.g., a first lateral direction) while the receptor 114 and second attachment mechanism 126 engage from, at least, a second lateral direction (e.g., from a second lateral direction opposite the first lateral direction) in order to hold the wearable device 102 in opposing directions to prevent removal without first actuating a release button 129 to disconnect the second attachment mechanism 126 from the receptor 114. For example, in carious embodiments, the guide surface 112 may include an at least partially angled and/or ramped surface.

In various embodiments, a combination of the orifice 132 and the first attachment mechanism 121 (e.g., the dynamic protrusion element 122), discussed herein, the receptor 114 and the second attachment mechanism 126 (e.g., the latch 127), also discussed herein, and the guide surface 112 and alignment surfaces thereof may collectively at least partially reduce all degrees of freedom of movement between the mounting apparatus 104 and a wearable device 102 provided in the installed position, as illustrated in FIG. 2.

In some embodiments, the mounting apparatus 104 may have a bottom surface 116 and a top surface 118. In some embodiments, at least a portion of the bottom and/or top surfaces 116, 118 may be at least substantially flat. Alternatively, and/or additionally, in various embodiments, at least a portion of the bottom and/or top surfaces 118, 116 may be curved or may otherwise define one or more complementary shapes with the wearable device 102. For example, it will be understood that the shape of the top and bottom surfaces 118, 116 of the mounting apparatus 104 may be configured in some embodiments to conform to the respective surfaces 106, 108 of the wearable device 102. In some embodiments, the bottom surface 116 may curve inwardly on itself. It will be understood that the bottom surface 116 may be curved as desired by a user and/or to accommodate and support the wearable device 102.

In various embodiments, an exemplary mounting apparatus 104 may comprise an attachment assembly 120 configured to engage at least a portion of the wearable device 102 to detachably secure the wearable device 102 relative to the wearable apparatus 104. In various embodiments, the attachment assembly 120 of the mounting apparatus 104 may be configured such that a wearable device 102 engaged therewith may be detached from the mounting apparatus 104 upon the wearable device 102 being subjected to a sufficiently large a breakaway force (e.g., a pulling force at least substantially away from the attachment assembly 120) and/or a user-driven detachment caused by user engagement with a release button 129, as described herein.

In various embodiments, as illustrated in FIGS. 1-2, the exemplary mounting apparatus 104 comprises an attachment assembly 120 that includes both a first attachment mechanism 121 and a second attachment mechanism 126, each configured to facilitate the detachable connection of the wearable device 102 to the attachment assembly 120 of the mounting apparatus 104 via an engagement with a respective portion of the wearable device 102. For example, the first attachment mechanism may facilitate a detachment via breakaway force while the second attachment mechanism 126 may facilitate a selective detachment via user-initiated actuation of a release button 129 defined by the second attachment mechanism 126. For example, the attachment assembly 120 may be configured such that the detachable configuration of the wearable device 102 relative to the mounting apparatus 104 may facilitate a detachment of the wearable device 102 from the mounting apparatus 104 that is defined by one or more of i) a breakaway detachment defined the dynamic protrusion element 122 being rearranged from a locked position to a release position based at least in part on one or more forces acting thereon via the wearable device 102, and ii) a user-initiated detachment defined by a user actuation of the release button 129.

In some embodiments, the mounting apparatus 104 may include a first attachment mechanism 121 configured to engage a corresponding portion of the wearable device 102 in order to at least partially secure the wearable device 102 relative to the mounting apparatus 104 in one or more direction and facilitate a detachment (e.g., a breakaway detachment) of the wearable device 102 from the attachment assembly 120 upon a separation force acting on the wearable device 102 such that a force greater than or equal to a threshold breakaway force is applied to the first attachment mechanism (e.g., applied to a dynamic protrusion element thereof).

In various embodiments, the first attachment mechanism 121 may comprise a dynamic protrusion element 122, a spring element 123, a knockout plate 124, and a cam element 125. In some embodiments, the first attachment mechanism 121 defined by the attachment assembly 120 of the mounting apparatus 104 may include a dynamic protrusion element 122 that, in some embodiments, may be provided along the top surface 118 of the mounting apparatus 104, at a lateral and of the mounting apparatus 104, and/or otherwise accessible to the wearable device 102 for engagement therewith. It will be understood that the dynamic protrusion element 122 may be dynamically integrated with the mounting apparatus 104 in a variety of manners to ensure proper functioning of the system 100. In some embodiments, the dynamic protrusion element 122 may be, for example, a hook or another similar structure capable of engaging and at least partially limiting the degrees of freedom of movement of the wearable device, alone or in combination with the latching mechanism described herein. In some embodiments, the dynamic protrusion element 122 may be defined by a protrusion portion configured for disposition in the orifice 132 and an at least partially curved and/or angled surface configured for engagement with at least one corresponding closed surface defining the orifice 132 of the wearable device 102. As illustrated, the dynamic protrusion element 122 may be configured to remain engaged with a spring element 123 such that the dynamic protrusion element 122 is urged by a spring force of the spring element 123 towards a left side of the illustrated embodiment (e.g., in the negative z-direction, as defined in the exemplary orientation illustrated in FIGS. 1 and 2).

In various embodiments, the first attachment mechanism 121 may be configured for engagement with at least a portion of the wearable device 102, such as, for example, the orifice 132, such that, upon the wearable device being provided in an installed position, as illustrated in FIG. 2, the first attachment mechanism 121 may at least partially restrict the movement of the wearable 102 relative to the mounting apparatus 104 in one or more directions. For example, the dynamic protrusion element 122 may defined one or more surfaces configured to engage a corresponding one or more surfaces of the orifice 132. In various embodiments, the dynamic protrusion element 122 may define a spring-loaded configuration. The first attachment mechanism 121 may be configured such that the dynamic protrusion element 122 has a spring-loaded configuration wherein an exemplary spring element 123 remains engaged with one or more inner and/or inward-facing surfaces of the dynamic protrusion element 122 such that the dynamic protrusion element 122 is urged towards in an outward lateral direction towards a left side of the illustrated embodiment (e.g., in the negative z-direction, as defined in the exemplary orientation illustrated in FIGS. 1 and 2). In such an exemplary configuration, the spring-loaded configuration of the first attachment mechanism 121 may bias the dynamic protrusion element 122 towards an engagement with one or more surfaces defining the orifice 132 of the wearable device 102, unless the dynamic protrusion element 122 is actuated in a laterally inward and/or rightward direction (e.g., in the negative z-direction, as defined in the exemplary orientation illustrated in FIGS. 1 and 2) to at least partially counteract the spring force of the bias spring element 123. For example, the dynamic protrusion element 122 may be actuated in the inward lateral direction from a locked position to a release position, as described herein, based on a sufficient breakaway force being imparted thereon from the corresponding surface of the wearable device 102 engaged therewith. As illustrated, the spring element 123 may be configured to bias the dynamic protrusion element 122 a first lateral direction (e.g., an outward lateral direction) that is at least substantially opposite of a second lateral direction defined by the bias direction of the latch 127 of the second latching mechanism 126).

In various embodiments, the dynamic protrusion element 122 comprises an at least partially curved and/or angled apparatus surface having a curved and/or angled configuration that that at least partially corresponds to a corresponding configuration of a surface of the wearable device 102 that the dynamic protrusion element 122 is configured to engage, such as, for example, one or more of the closed surfaces defining the orifice 132. In various embodiments, the curved apparatus surface of the 122 may be configured to facilitate a breakaway functionality of an exemplary wearable device 102 relative to the mounting apparatus 104 (e.g., from the attachment assembly 120) upon a threshold breakaway force acting on the wearable device 102 in a separation direction at least substantially away from the attachment assembly 120 of the mounting apparatus 104 (e.g., at least substantially away from the top surface 118). For example, as a result of the curved apparatus surface and the spring-loaded configuration of the dynamic protrusion element 122, a threshold breakaway force pulling the wearable device 102 away from the mounting apparatus 104 may result in a force being imparted on the dynamic protrusion element 122 that counteracts the bias spring force of the spring 123, thereby pushing the dynamic protrusion element 122 in an inward lateral direction (e.g., towards the second attachment mechanism 126) and causing the spring element 123 to at least partially retract.

In some embodiments, the mounting apparatus 104 may include a second attachment mechanism 126 configured to engage a corresponding portion of the wearable device 102 in order to at least partially secure the wearable device 102 relative to the mounting apparatus 104 in one or more direction and enable the selective detachment of the wearable device 102 therefrom upon user actuation thereof (e.g., via a release button 129). As illustrated, in various embodiments, the second attachment mechanism 126 may include a latch 127 connected to and/or integrated with a latch base 128. In some embodiments, the latch 127 may be operated by means of a release button 129 that, in some embodiments, may be connected and/or integrated with the latch base 128. In the depicted embodiment of FIG. 2, the second attachment mechanism 126 may define a spring-loaded configuration, wherein an exemplary spring element 128a remains engaged with the latch base 128 such that the latch 127 is urged towards a right side of the illustrated embodiment (e.g., in the positive z-direction, as defined in the exemplary orientation illustrated in FIGS. 1 and 2). In such an exemplary configuration, the spring-loaded configuration of the second attachment mechanism 126 may bias the latch 127 towards an engagement with the receptor 114, unless the release button 129 is actuated in a leftward direction (e.g., in the negative z-direction, as defined in the exemplary orientation illustrated in FIGS. 1 and 2) to at least partially counteract the spring force of the spring element 128a. In some embodiments, the mounting apparatus 104 may be configured such that, when the dynamic protrusion element 122 is oriented toward the orifice 132 and the wearable device is pushed down onto the second attachment mechanism 126 (e.g., onto the latch 127), the second attachment mechanism 126 (e.g., the latch 127) may automatically engage the receptor 114. The release button 129 may automatically actuate in response to the downward force of the wearable device 102 on the latch 127, and in some embodiments, the release button 129 may only require actuation by a user to release the wearable device 102. In some embodiments, the spring force of the second attachment mechanism 126 may be configured to at least partially aid in preventing inadvertent detachment of the wearable device 102 from the mounting apparatus 104 in the event that, for example, the wearable device 102 and/or the mounting apparatus 104 is impacted. For example, as described herein, a threshold breakaway force defined by the attachment assembly 120 of an exemplary mounting apparatus 104 may at least partially correspond to the spring force of the spring element 128a included in the second attachment mechanism 126.

In some embodiments, the latch base 128 may be covered by a shield plate 127a that is removably attached to the top surface 118 of the mounting apparatus 104. In some embodiments, the shield plate 127a may protect the latch 127 from interference and/or damage by a user. In some embodiments, the shield plate 127a may also protect the second attachment mechanism 126 (e.g., the latch 127) from inadvertently being triggered by a user during a non-ideal time (i.e., when the user does not want to disconnect the wearable device 102 from the mounting apparatus 104). In some embodiments, the shield plate 127a may be removable to service or replace the second attachment mechanism 126. As illustrated, in various embodiments, the latch 127 may comprise a hook shape, a loop shape, and/or any other shape operable to facilitate an engagement with the wearable device 102 (e.g., the receptor 114), as described herein.

In some embodiments, the bottom surface 116 may include a hooked end 130 that, in some embodiments, may be disposed at the distal end of the bottom surface 116; that is, in some embodiments, the hooked end 130 may be disposed on the opposite end of the bottom surface 116 from the second attachment mechanism 126 (e.g., the latch base 128). The hooked end 130 may be configured, for example, to support at least a portion of the wearable device 102, such as the battery pack 110, as shown in FIG. 2.

According to some embodiments, the features described above with respect to at least FIGS. 1 and 2 may allow for "blind insertion" of the wearable device 102 to the mounting apparatus 104 while the mounting apparatus 104 is being worn by a user. It will be understood that the mounting apparatus 104 may be worn in a variety of locations on a user (e.g., on a user's arm, on a user's belt, etc.). It will be further understood that, in some embodiments, the mounting apparatus 104 may be placed on a structure near a user (e.g., on a forklift, on a vehicle dashboard, etc.). In some embodiments, the system 100 may allow a rotational degree of freedom and quick release ejection in the same direction (i.e., by means of the release button 129). Further, as described in further detail herein, in various embodiments, the wearable device mounting system 100 may include a mounting apparatus 104 configured to detachably secure a wearable device 102 relative thereto in an installed position at least in part based on a first attachment mechanism 121 that utilizes a dynamic protrusion element 122 to facilitate a breakaway functionality of the wearable device 102 relative to the mounting apparatus 104.

According to some embodiments, FIG. 1 may illustrate either the wearable device 102 immediately prior to being attached to the mounting apparatus 104 (e.g., by means of the latch 127 snapping into engagement with the receptor 114), or in the process of being un-attached from the mounting apparatus 104 (e.g., by means of the release button 129). In the depicted embodiment, the wearable device 102 may be attached to the mounting apparatus 104 by engaging the dynamic protrusion element 122 with the guide surface 112 and subsequently pivoting the wearable device 102 until the latch 127 snaps into engagement with the receptor 114. Alternatively, the wearable device 102 may be attached to the mounting apparatus 104 by translationally sliding the wearable device 102 along the top surface 118 of the mounting apparatus 104 until both the dynamic protrusion element 122 and the latch 127 engage their respective counterpart guide surface 112 (e.g., orifice 132) and receptor 114.

Figure 3:
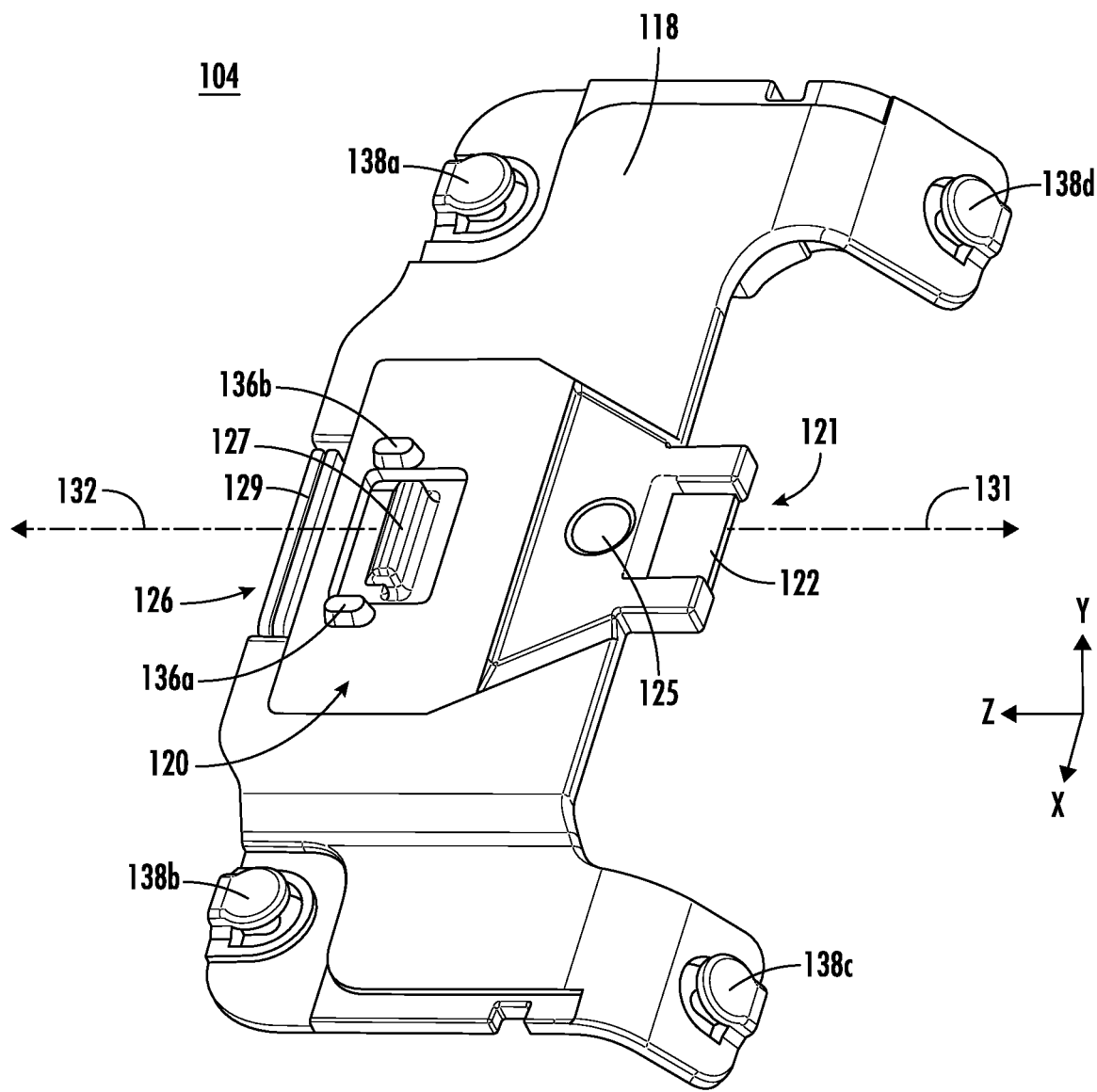
FIG. 3 is an angled view of an example wearable device mounting system with an attachment assembly having a dynamic protrusion element in accordance with various embodiments of the present disclosure.

As an illustrative example, FIG. 3 illustrates an exemplary mounting apparatus 104 having an exemplary attachment assembly 120 in accordance with various embodiments described herein, wherein the attachment assembly 120 comprises a first attachment mechanism 121 configured to engage a first portion of a wearable device and a second attachment mechanism 126 configured to engage a second portion of the wearable device. In various embodiments, when an exemplary wearable device is secured to the mounting apparatus 104 (e.g., via the attachment assembly 120), the first attachment mechanism 121 may be configured to engage a corresponding orifice defined by the wearable device, and the second attachment mechanism 126 may be configured to engage a corresponding receptor defined by the wearable device, as described herein. In such an exemplary circumstance, the first attachment mechanism 121 may be configured to engage the first portion of the wearable device via the dynamic protrusion element 122, which may be arranged within the corresponding orifice of the wearable device and/or in contact with one or more surfaces of the orifice such that a first retention force 131 (e.g., defined at least in part by a pushing force) is imparted on the wearable device in a first lateral direction (e.g., in the negative z-direction, as defined in the exemplary orientation illustrated in FIG. 3). Further, as illustrated, the second attachment mechanism 126 may be configured to engage the second portion of the wearable device via the latch 127, which may be so as to contact a receptor and/or latch onto a corresponding receptor of the wearable device such that a second retention force 132 (e.g., defined at least in part by a pushing force) is imparted on the wearable device in a second lateral direction that is at least substantially opposite the first lateral direction (e.g., in the positive z-direction, as defined in the exemplary orientation illustrated in FIG. 3).

In various embodiments, the first and second retention forces 131, 132 imparted on the wearable device from the attachment assembly 120 may be defined at least in part by the spring-loaded configurations of the first attachment mechanism 121 (e.g., the dynamic protrusion element 122) and the second latching mechanism (e.g., the latch 127), respectively. For example, as described herein, the first attachment mechanism 121 may comprise a first spring element that remains in contact with the dynamic protrusion element 122 such that the translation of the dynamic protrusion element 122 along a lateral axis (e.g., in one or more lateral directions along the z-axis, as defined in the exemplary orientation illustrated in FIG. 3) is biased towards the first lateral direction (e.g., in the negative z-direction, as defined in the exemplary orientation illustrated in FIG. 3) by a spring force that acts on the dynamic protrusion element 122 in the first lateral direction and varies as the first spring element is reconfigured between a fully compressed configuration and a nominal (e.g., a partially compressed) configuration. Further, the second attachment mechanism 126 may comprise a second spring element that remains in contact with the latch base such that the translation of the latch along a lateral axis (e.g., in one or more lateral directions along the z-axis, as defined in the exemplary orientation illustrated in FIG. 3) is biased towards the second lateral direction (e.g., in the positive z-direction, as defined in the exemplary orientation illustrated in FIG. 3) by a spring force that acts on the latch base in the second lateral direction and varies as the second spring element is reconfigured between a fully compressed configuration and a nominal (e.g., a partially compressed) configuration.

Referring back to FIG. 2, in various embodiments, as illustrated, a first spring element 123 operably connected to the dynamic protrusion element 122 may apply a spring force to the dynamic protrusion element 122 in a first lateral direction (e.g., in the negative z-direction, as defined in the exemplary orientation illustrated in FIG. 2) that pushes the dynamic protrusion element 122 in a corresponding outward direction away from the second latch mechanism 126 (e.g., and into the corresponding orifice 132 defined by the wearable device 102). Further, in various embodiments, a second spring element 128a operably connected to the latch base 128 may apply a spring force to the latch base 128 in a second lateral direction at least substantially opposite the first lateral direction (e.g., in the positive z-direction, as defined in the exemplary orientation illustrated in FIG. 2) that pushes the latch 127 in a corresponding outward direction away from the dynamic protrusion element 122 (e.g., and into the corresponding receptor 114 defined by the wearable device 102).

In various embodiments, an attachment assembly 120 of an exemplary mounting apparatus 104 may be configured such that a wearable device 102 connected to the mounting apparatus 104 (e.g., in an installed position) may be detached therefrom via one or both of i) a user interaction with a second attachment mechanism 126 and ii) a breakaway functionality wherein, upon an impact to the system 100 that results in a pulling force at least substantially greater than a predetermined threshold breakaway force acting on the wearable device 102 in a direction at least substantially away from the mounting apparatus 104, the first attachment assembly 121 utilizes the detachable dynamic protrusion element 122 (e.g., and the adjustable breakaway force configuration) to facilitate a breakaway separation of the wearable device 102 from the mounting apparatus 104. For example, an exemplary mount apparatus 104 may be configured to enable a selective detachment of the wearable device 102 therefrom via a user interaction with the second attachment mechanism 126 defined at least in part by an actuation of the release button 129. For example, a detachment of the wearable device 102 from the mount apparatus 104 may include the user pushing the release button 129 while simultaneously lifting the receptor 114 clear of the latch 127 in at least partially the same direction, such that the wearable device 102 can be removed single handed. In some embodiments, during removal, the user may rotate the wearable device 102 after pushing the release button 129. The guide surface 112 may facilitate repeatable and intuitive connection between the wearable device 102 and the mounting apparatus 104 without requiring the user to precisely align the components prior to engagement, and in embodiments where the latch 127 engages the receptor 114 subsequent to engagement of the guide surface 112 and the attachment mechanism (e.g., dynamic protrusion element 122), the latch 127 may already be aligned with the receptor 114 by virtue of the guide surface 112 already aligning the orifice 132 with the dynamic protrusion element 122.

As a further example, in various embodiments, the exemplary mount apparatus 104 may be further configured to enable a breakaway detachment of the wearable device 102 from the mount apparatus 104 in a circumstance wherein, for example, the wearable device 102 and/or the mounting apparatus 104 is impacted such that the wearable device 102 is urged to decouple from the mounting apparatus 104 (e.g., the attachment assembly 120), such as, for example, by a resultant force that pulls the wearable device 102 in a direction at least substantially away from the attachment assembly 120 (e.g., the top surface 118) of the mounting apparatus 104. For example, as described in further detail herein, a separation force that is greater than or equal to a threshold breakaway force defined by the first attachment mechanism 121 of the attachment assembly 120 may cause one or more surfaces of the wearable device 102 abutted against the dynamic protrusion element 122 to push the dynamic protrusion element 122 away from the locked position, thereby enabling a relative movement of the wearable device 102 away from the attachment assembly 120 (e.g., away from an installed position defined along a top surface 118 of the mounting apparatus 104).

In various embodiments, and as shown in at least FIG. 3, an exemplary mounting apparatus 104 may include a plurality of keyed features 136A, 136B. In some embodiments, these keyed features 136A, 136B may be bump-outs or other alignment features that protrude from the mounting apparatus 104 to engage corresponding openings in the wearable device. In some embodiments, the keyed features 136A, 136B may further enable the alignment of the receptor with the latch 127. That is, in some embodiments, the keyed features 136A, 136B may limit or prevent the receptor 114 from sliding too far laterally (e.g., left or right) as the wearable device is operably attached to the mounting apparatus 104 by aligning the wearable device with the mounting apparatus. In some embodiments, the keyed features 136A, 136B may aid in preventing the wearable device from being inadvertently detached from the mounting apparatus 104 in the event that, for example, the wearable device and or the mounting apparatus 104 is impacted by requiring the wearable device to be lifted vertically off the mounting apparatus for removal. Further, in some embodiments, as shown, the mounting apparatus 104 may have a plurality of fasteners 138A, 138B, 138C, and 138D, into which one or more straps may engage to secure the mounting apparatus 104 to a user's wrist (e.g., as part of a strap).

Figure 4A:
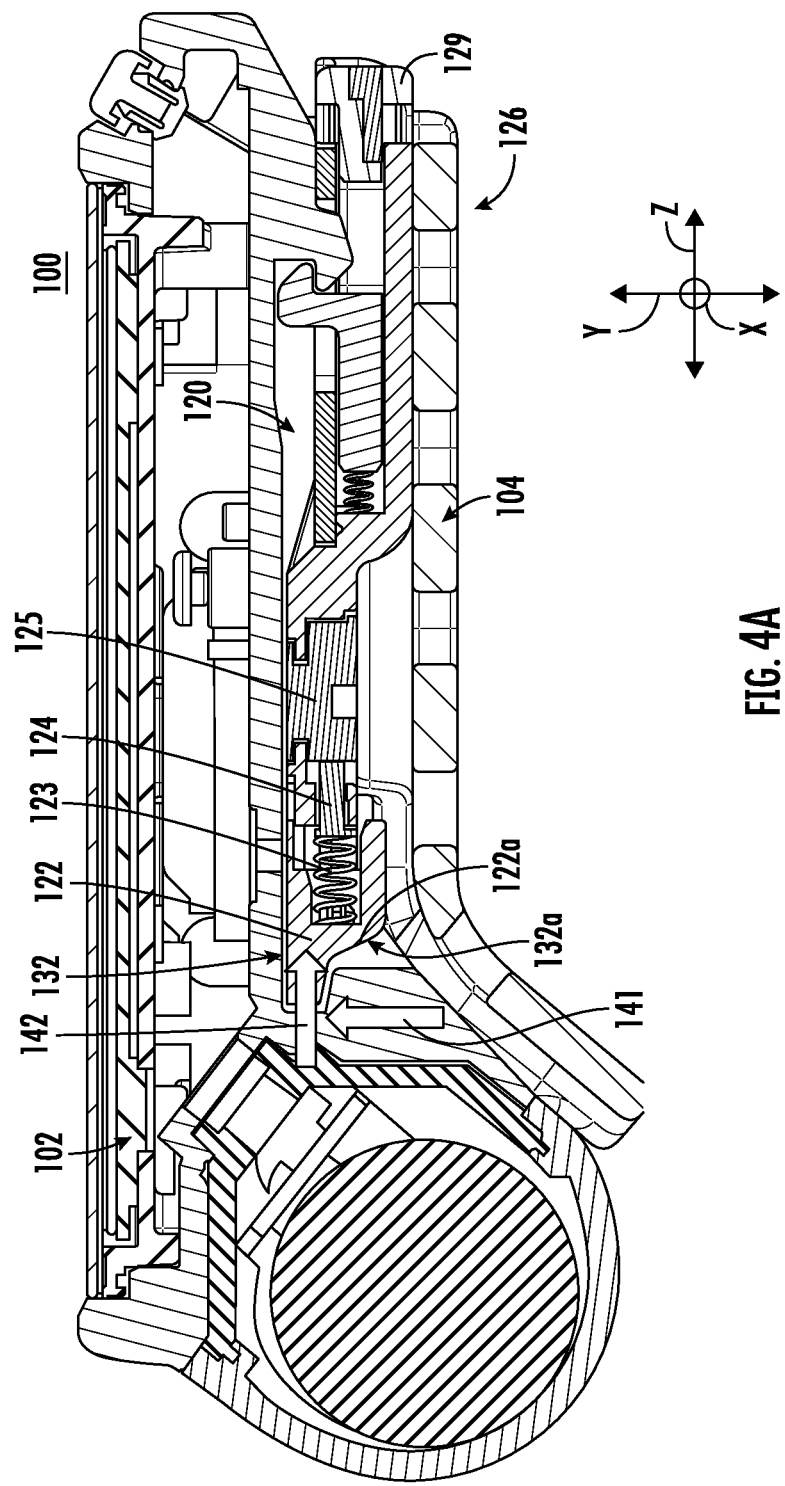
FIGS. 4A and 4B illustrate example side cross-sectional views of a wearable device mounting system with an attachment assembly having a dynamic protrusion element in accordance with various embodiments of the present disclosure.
Figure 4B:
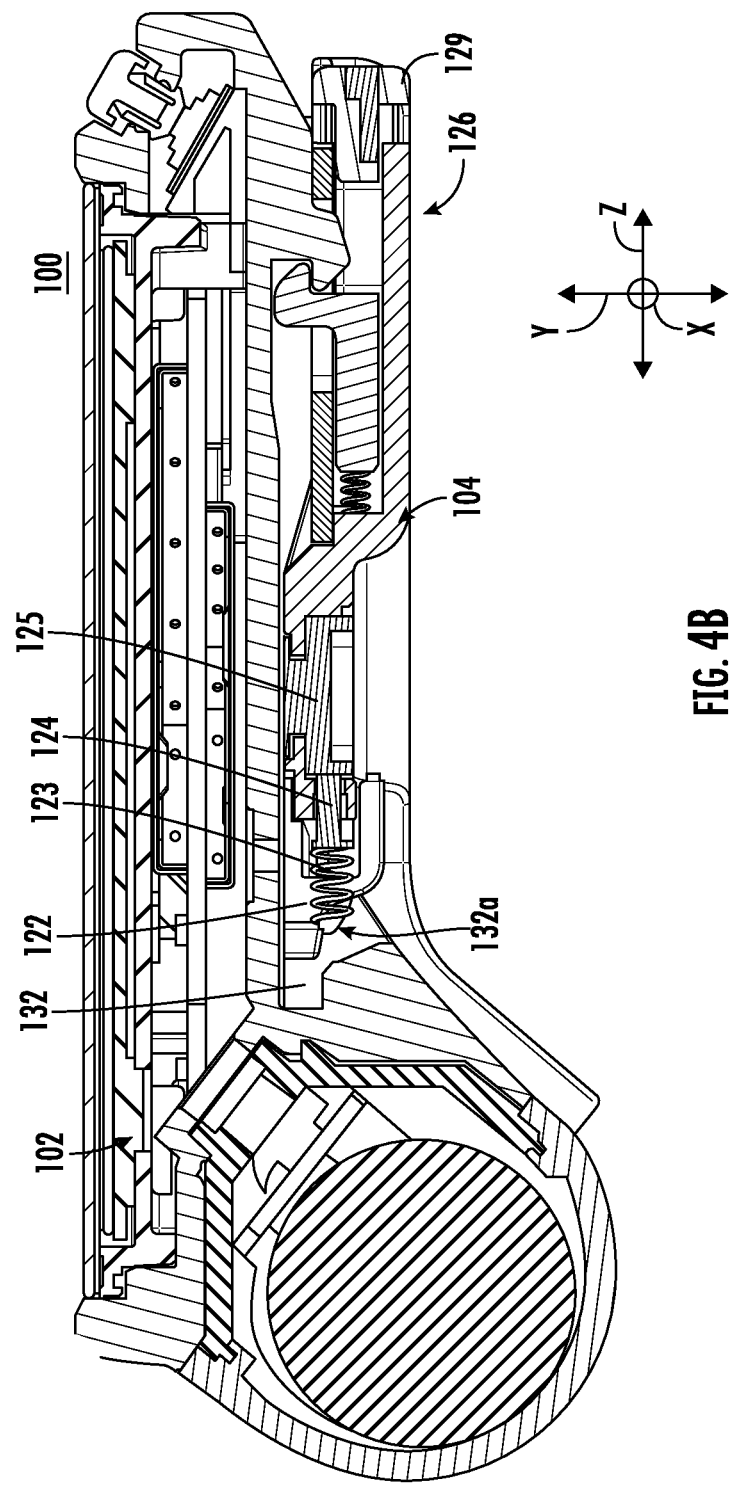

FIGS. 4A and 4B illustrate example side cross-sectional views of a wearable device mounting system with an attachment assembly having a dynamic protrusion element in accordance with various embodiments of the present disclosure. In particular, FIG. 4A illustrates a cross-sectional side view of an exemplary system 100 with the wearable device 102 operably connected (e.g., in an installed position) to the attachment assembly 120 of the mounting apparatus 104 such that the dynamic protrusion element 122 of the first attachment mechanism 121 is provided in a locked position. Further, FIG. 4B illustrates a cross-sectional side view of an exemplary system 100 wherein the dynamic protrusion element 122 of the first attachment mechanism 121 is provided in a release position such that the wearable device 102 may be detached from the attachment assembly 120 of the mounting apparatus 104 to enable the breakaway functionality defined by the system 100.

In various embodiments, the locked position of the illustrated dynamic protrusion element 122 is defined by the dynamic protrusion element 122 being configured in an outward position relative to the cam element 125 (e.g., away from the cam element 125, such as, for example, in the negative z-direction, as defined in the exemplary orientation illustrated in FIG. 4A) such that the dynamic protrusion element 122 is engaged with a first portion of the wearable device 102 (e.g., one or more surfaces of the orifice 132) and at least partially restricts the movement of the wearable device 102 relative to the mounting apparatus 104 in one or more directions (e.g., in a vertical direction, such as, for example, in the positive y-direction, as defined in the exemplary orientation illustrated in FIG. 4A). For example, as described herein, the dynamic protrusion element 122 may be translated, shifted, and/or otherwise configured in the locked position, as illustrated in FIG. 4A, as a result of the spring element 123 coupled with the dynamic protrusion element 122 applying a bias spring force to the dynamic protrusion element 122 in an outward lateral direction (e.g., in the negative z-direction, as defined in the exemplary orientation illustrated in FIG. 4A) so as to push the dynamic protrusion element 122 into the orifice 132 to physically prevent the wearable device 102 from detaching from the mounting apparatus 104.

In various embodiments, as described herein, the dynamic protrusion element 122 of the first attachment mechanism 121 defined by the mounting apparatus 104 may be configured to enable a breakaway functionality of the wearable device 102 relative thereto by moving in one or more lateral directions (e.g., along the z-axis, as defined in the exemplary orientation illustrated in FIG. 4A) to compress and/or retract the laterally-configured spring element 123 engaged therewith in response to, for example, an impact to the system 100 that results in a separation force pulling the wearable device 102 in a direction at least substantially away from the mounting apparatus 104. For example, as illustrated in FIG. 4A, the orifice 132 defines a sloped surface 132a that is configured for engagement with a corresponding sloped surface 122a of the dynamic protrusion element 122 when the dynamic protrusion element 122 is provided in the locked position (e.g., as a result of the bias spring force acting thereon from the spring element 123). The sloped surface 122a of the dynamic protrusion element 122 may define a sloped and/or angled surface with a slope defined relative to the lateral direction such that the surface 122a has an at least partially downward-facing and an at least partially outward-facing orientation.

In various embodiments, the sloped surface 122a of the dynamic protrusion element 122 is configured such that an upward force applied thereto may cause the dynamic protrusion element 122 to be pushed in an inward lateral direction at least partially away from the surface 132a. As an illustrative example, the sloped surface 122a of the dynamic protrusion element 122 is configured such that an at least partially upward pushing force imparted on the surface 122a from the corresponding sloped surface 132a of the orifice 132 in response to the wearable device 102 being forced and/or pulled in an upward direction away from the mounting apparatus 104 (e.g., as a result of an impact or collision affecting the system 100) may cause the dynamic protrusion element 122 to translate in an inward lateral direction towards the cam element 125 (e.g., in the positive z-direction, as defined in the exemplary orientation illustrated in FIG. 4A). As an illustrative example, FIG. 4A shows a first separation (e.g., breakaway) force 141 acting on the wearable device 102 in an at least substantially upward direction (e.g., in the positive y-direction, as defined in the exemplary orientation illustrated in FIG. 4A). As illustrated, the first attachment mechanism 121 may be configured such that the upward separation force 141 acting on the wearable device 102 causes a physical engagement between the corresponding sloped surfaces 132a, 122a of the orifice 132 and the dynamic protrusion element 122 that results in an at least partially lateral resultant force 142 acting on the dynamic protrusion element 122 in an inward lateral direction towards the cam element 125 (e.g., in the positive z-direction, as defined in the exemplary orientation illustrated in FIG. 4A). For example, the first attachment mechanism 121 may be configured such that the lateral resultant force 142 drives a corresponding inward lateral movement of the dynamic protrusion element 122 towards the springe element 123.

For example, a resultant inward lateral movement of the dynamic protrusion element 122 may impart a compression force on the spring element 123 engaged therewith. As illustrated, the spring element 123 may be disposed between the dynamic protrusion element 122 and a knockout plate 124 such that the opposing ends thereof are in physical contact with the dynamic protrusion element 122 and the knockout plate 124, respectively. As shown, the knockout plate 124 may define a biased configuration towards the cam element 125 in which a bias spring force from the spring element 123 at least substantially consistently acts on the knockout plate 124 in the inward lateral direction, causing the knockout plate 124 to remain pressed against a portion of the perimeter surface of the cam element 125 aligned therewith and preventing the knockout plate 124 from translating in the inward lateral direction (e.g., beyond the perimeter surface of the cam element 125). Accordingly, the compression force applied to the spring element 123 upon the inward lateral translation of the dynamic protrusion element 122 may cause the spring element 123 to compress from a nominal position (e.g., defined by the partially compressed state of the spring element 123 when the dynamic protrusion element 212 is in the locked position) to an at least partially compressed state beyond the nominal configuration and/or to a fully compressed configuration.

In various embodiments, the dynamic protrusion element 122 may be configured such that a slope shear force acting on the sloped surface 122a thereof from the wearable device 102 (e.g. the corresponding sloped surface 132a engaged therewith) may cause an automatic retraction of the first attachment mechanism 121 that is defined by the inward lateral translation of the dynamic protrusion element 122 and the corresponding compression of the spring element 123. In various embodiments, the automatic retraction of the first attachment mechanism 121 may be defined by the dynamic protrusion element 122 moving from the locked position illustrated in FIG. 4A to a release position illustrated in the exemplary embodiment of FIG. 4B. In various embodiments, the release position of an exemplary dynamic protrusion element 122 may be defined by the dynamic protrusion element 122 being translated in the inward lateral direction (e.g., in the positive z-direction, as defined in the exemplary orientation illustrated in FIG. 4A) to a position wherein at least a portion of the dynamic protrusion element 122 that was initially disposed within the orifice 132 (e.g., when the dynamic protrusion element 122 was in the locked position) has been removed therefrom such that the dynamic protrusion element 122 is no longer operable to restrict the motion of the wearable device 102 in the upward direction. For example, the dynamic protrusion element 122 being arranged in the release position may allow for an upward separation force 141 drive a movement of the wearable device 102 that causes the orifice 132 to disengage the dynamic protrusion element 122. Such a disengagement, caused by a separation (e.g., breakaway) force acting on the wearable device 102 that pushes the dynamic protrusion element 122 into the illustrated release position, may enable the breakaway functionality of the system 100 (e.g., the wearable device 102 relative to the mounting apparatus 104) by allowing the wearable device 102 to detach from the mounting apparatus 104 via a non-user-initiated disengagement from the first attachment mechanism 121.

In various embodiments, the first attachment mechanism 121 of the mounting apparatus 104 may be configured to automatically retract the dynamic protrusion element 122 to the release position, as described above, in response to a collision and/or other impact to the system 100 generating a sufficiently large separation (e.g., breakaway) force that pulls the wearable device 102 away from its installed position at the mounting apparatus 104. In various embodiments, such an automatic retraction of the dynamic protrusion element 122 allows for the wearable device 102 to disengage the attachment assembly 120 and break away from the mounting apparatus 104 without user interaction with the mounting apparatus 104. As described herein, the first attachment mechanism 121 of the mounting apparatus 104 may be configured to such that the above-described breakaway functionality may be executed by the system 100 in an exemplary circumstance wherein the separation (e.g., breakaway) force acting on the wearable device 102 is at least substantially greater than or equal to a predetermined threshold breakaway force.

In various embodiments, the predetermined threshold breakaway force may be defined at least in part by the configuration of the spring element 123 of the first attachment mechanism 121. For example, a predetermined threshold breakaway force may be defined by the minimum amount of force sufficient to counteract the bias spring force being applied to the dynamic protrusion element 122 by the spring element 123 such that the dynamic protrusion element 122 is moved (e.g., pushed) from the locked position (e.g., as shown in FIG. 4A) in the inward lateral direction towards the release position (e.g., as shown in FIG. 4B). For example, when the dynamic protrusion element 122 is in the locked position, as shown in FIG. 4A, the spring element 123 defines a nominal configuration wherein the spring element 123 applies an outward lateral bias spring force to the dynamic protrusion element 122 that is greater than an inwardly-directed resultant force 142 acting on the dynamic protrusion element 122 (e.g., from the wearable device 102). As such, the dynamic protrusion element 122 remains in an outermost locked position. By contrast, a threshold breakaway force may be defined by a force acting on the wearable device 102 that is sufficiently large such that the inwardly-directed resultant force 142 exerted on the dynamic protrusion element 122 is greater than the bias spring force being applied to the dynamic protrusion element 122 when the spring element 133 is in the nominal configuration. As such, a separation force greater than the threshold breakaway force may effectively counteract and/or overcome the bias spring force acting on the dynamic protrusion element 122 such that a surface of the wearable device 102 (e.g., sloped surface 132a, as described herein) pressing against the dynamic protrusion element 122 may cause the dynamic protrusion element 122 to retract towards a release position.

In various embodiments, the spring force acting on the dynamic protrusion element 122 in the outward lateral direction at a particular instance may depend on the extent to which the spring element is compressed at that instance (e.g., the compressed state of the spring element 123 between a fully compressed configuration and a nominal configuration) and/or the length of the spring element 123 defined by the lateral distance between the opposing lateral ends of the spring element 123 engaged with the dynamic protrusion element 122 and the knockout plate 124 (e.g., the first lateral end 124b of the knockout plate 124), respectively. Accordingly, as described herein, the threshold breakaway force defined by a first attachment mechanism 121 in a given configuration (e.g., the force required to detach the wearable device 102 from the mounting apparatus 104 without actuating the release button 129 to disengage the second attachment mechanism 126 from the wearable device 102) may correspond to the configuration of the spring element 123, such as, for example, the spring length thereof and/or the spring force exhibited by the spring element 123 when the first attachment mechanism 121 is arranged in the given configuration.

Figure 5A:
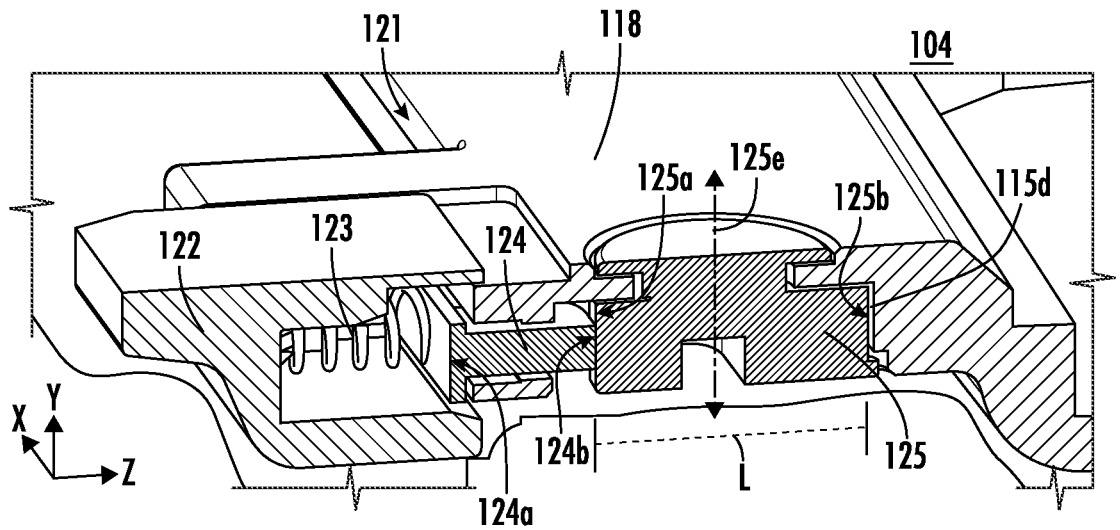
FIGS. 5A and 5B illustrate isolated cross-sectional perspective views of example attachment mechanisms having a dynamic protrusion element and being selectively configurable to facilitate an adjustable threshold breakaway force in accordance with various embodiments of the present disclosure.
Figure 5B:
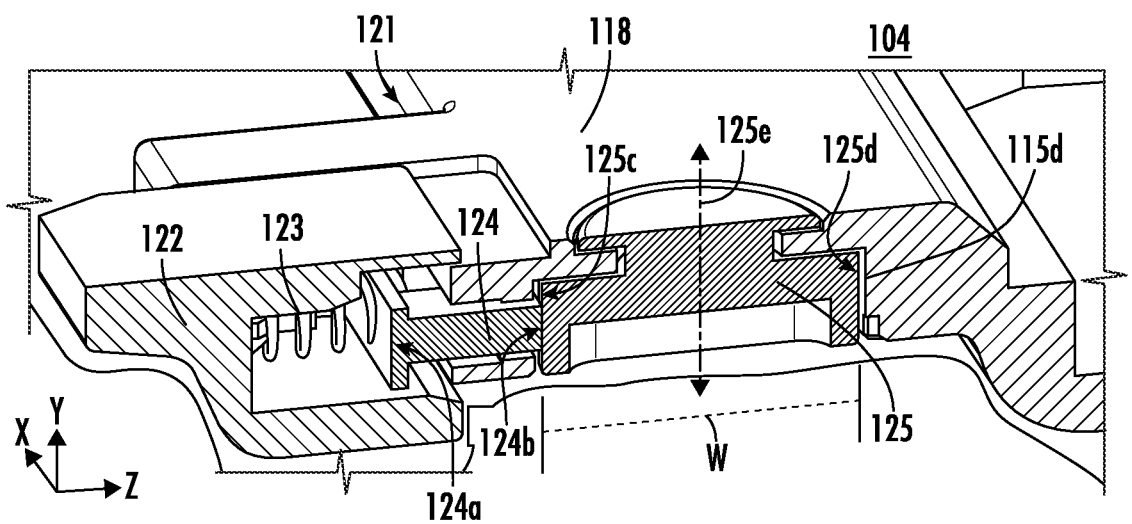

In various embodiments, an exemplary mounting apparatus 104 may be configured such that the threshold breakaway force required to detach the wearable device 102 from the mounting apparatus 104 (e.g., without actuating the release button 129 of the second attachment mechanism 126) may be adjusted between a plurality of predefined threshold breakaway forces based on a selective arrangement of the first attachment mechanism 121 in one of a plurality of configurations by a user. In various embodiments, the first attachment mechanism 121 may be selectively configurable between a plurality of configurations defined at least in part by the rotational arrangement of the cam element 125, each of the plurality of available configurations defined by the first attachment mechanism corresponding to a different predetermined threshold breakaway force that may be utilized by the wearable device mounting system 100 when the first attachment mechanism 121 is in the corresponding configuration. As an illustrative example, FIGS. 5A and 5B illustrate isolated cross-sectional perspective views of an example attachment mechanism having a dynamic protrusion element and being selectively configurable to facilitate an adjustable threshold breakaway force in accordance with various embodiments of the present disclosure. In particular, FIG. 5A illustrates an isolated cross-sectional side view of a first attachment mechanism 121 comprising a cam element 125 arranged in a first cam position such that the first attachment mechanism 121 defines a first threshold breakaway force, and FIG. 5B illustrates an isolated cross-sectional side view of the first attachment mechanism 121 wherein the cam element 125 is arranged in a second cam position such that the first attachment mechanism 121 defines a second threshold breakaway force that is different than the first threshold breakaway force.

As described herein, the mounting apparatus 104 may define a cam element seat 115 within which the cam element 125 is secured such that the cam element 125 may rotate about a central axis 125e thereof. In various embodiments, the cam element 125 may be reconfigured from a first cam position to a second cam position in order to selectively adjust the threshold breakaway force defined by the first attachment mechanism 121 from a first threshold breakaway force to a second threshold breakaway force. As illustrated, the first attachment mechanism 121 comprises a knockout plate 124 disposed between the spring element 123 and a perimeter surface of the cam element 125. The knockout plate 124 may be configured to define a first lateral end 124a and a second lateral end 124b, wherein the first lateral end 124a remains engaged with the spring element 123 and the second lateral end remains engaged with at least a portion of the perimeter surface of the cam element 125. In various embodiments, the spring element 123 may impart a bias spring force on the first lateral end 124a of the knockout plate 124 that may be bias the knockout plate 124 in an inward lateral direction (e.g., in a positive z-direction, as defined in the exemplary orientation illustrated in FIGS. 5A and 5B) towards the cam element 125. For example, the spring force from the spring element 123 may at least substantially consistently push the knockout plate 124 towards the cam element 125 such that the second lateral end 124b of the knockout plate 124 remains physically abutted against the perimeter surface of the cam element 125. The knockout plate 124 of the first attachment mechanism 121 has a biased configuration wherein the second lateral end 124b thereof remains physically abutted against the perimeter surface of the cam element 125 as the cam element 125 is rotated about the central axis 125e between the first cam position and the second cam position. Such an exemplary configuration enables the adjustability of the threshold breakaway force defined by the first attachment mechanism 121, which may be selectively varied as the user adjusts (e.g., rotates) the cam position of the cam element 125 (e.g., operably adjusting the position of the knockout plate 124 so as to affect the compressed state of the spring element and, therefore, the bias spring force being imparted on the dynamic protrusion element 122).

For example, as illustrated in FIGS. 5A and 5B, the cam element 125 may define an asymmetrical shape relative to one or more axes spanning opposing ends of the cam element 125 (e.g., between a first cam end 125*a* and a second cam end 125*b* and/or between a third cam end 125*c* and a fourth cam end 125*d*). For example, the cam element 125 may have an at least substantially rounded configuration defined by a variable diameter at one or more angular locations about the central axis 125*e*. For example, in various embodiments, as illustrated in FIGS. 5A and 5B, an exemplary cam element 125 may have a cam length (e.g., a first diameter) defined by a first distance between a first set of opposing ends of the cam element 125 (e.g., between a first cam end 125*a* and an opposing second cam end 125*b*) that is at least substantially different than (e.g., greater than and/or less than) a cam width (e.g., a second diameter), which is defined by a second distance between a second set of opposing ends of the cam element 125 (e.g., between a third cam end 125*c* and an opposing fourth cam end 125*d*). In such an exemplary configuration, as the cam element 125 is rotated within the cam element seat 115 about the central axis 125*e*, the position of the knockout plate 124 relative to the spring element 123 (e.g., along a lateral axis defined in the z-direction, as defined in the exemplary orientation illustrated in FIGS. 5A and 5B) may vary based on a lateral dimension (e.g., the cam length or the cam width) exhibited by the cam element 125 (e.g., as measured in the z-direction, as defined in the exemplary orientation illustrated in FIGS. 5A and 5B) when the cam element is arranged in each of the plurality of cam positions. For example, based at least in part on the biased configuration of the knockout plate 124 in the inward lateral direction, the lateral dimension of a cam element 125 may be defined by the distance between the set of opposing ends of the cam element 125 (e.g., the diameter) that collectively define a shared axis that extends in an at least substantially lateral direction (e.g., in the z-direction, as defined in the exemplary orientation illustrated in FIGS. 5A and 5B). For illustrative purposes, based at least in part on the biased configuration of the knockout plate 124 in the laterally inward direction, the lateral dimension defined by a cam element 125 may correspond to the lateral distance between the second lateral end 124*b* of the knockout plate 124 and an innermost lateral end 115*c* of the cam element seat 115.

As a non-limiting example provided for illustrative purposes, the cam element 125 of the exemplary first attachment mechanism 121 illustrated in FIG. 5A is arranged in a first cam position. For example, as illustrated, the cam element 125 being arranged in the first cam position may be defined by the cam element 125 being adjusted, rotated, and/or otherwise positioned about the central axis 125*e* such that the lateral dimension of the cam element 125 is the cam length L, defined by a first distance between the first cam end 125*a* and the opposing second cam end 125*b*, as measured in the lateral direction. As described above, based at least in part on the spring element 123 biasing the knockout plate 124 in the laterally inward direction against the perimeter surface of the cam element 125, the cam element 125 being selectively arranged in the first cam position may result in a lateral translation of the knockout plate 124 such that the second lateral end 124*b* of the knockout plate 124 remains positioned against the perimeter surface of the cam element 125. For example, the cam element 125 being selectively rearranged from another cam position to the first cam position may cause the lateral distance between the second lateral end 124*b* of the knockout plate 124 and an innermost lateral end 115*c* of the cam element seat 115 to change (e.g., increase and/or decrease) by a lateral distance corresponding to the difference between the lateral dimension of the cam element 125 in the initial cam position and the cam length L defined by the cam element 125 in the illustrated first cam position.

As a further non-limiting example provided for illustrative purposes, the cam element 125 of the exemplary first attachment mechanism 121 illustrated in FIG. 5B is arranged in a second cam position. For example, as illustrated, the second cam position may be defined by the cam element 125 being adjusted (e.g., rotated about the central axis 125*e*) to a rotational position wherein the lateral dimension exhibited by the cam element 125 is defined by the cam width W. As an illustrative example, the cam width W of the cam element 125 may be defined by a second distance measured between a second set of opposing ends of the cam element 125, such as, for example, between the third cam end 125*c* and the opposing fourth cam end 125*d*. For example, the cam element 125 being selectively rearranged from another cam position to the second cam position illustrated in FIG. 5B may cause the lateral distance between the second lateral end 124*b* of the knockout plate 124 and an innermost lateral end 115*c* of the cam element seat 115 to change (e.g., increase and/or decrease) by a lateral distance corresponding to the difference between the lateral dimension defined by the cam element 125 in the initial cam position and the cam width W defined by the cam element 125 in the illustrated second cam position.

As an illustrative example, in various embodiments, the cam element 125 may be asymmetrically configured such that the cam width W defined by the cam element 125 is greater than the cam length L defined by the cam element 125. In such an exemplary configuration, an adjustment of the cam element 125 defined by a rotation of the cam element 125 (e.g., about the central axis 125*e*) from the first cam position to the second cam position may cause the lateral distance between the second lateral end 124*b* of the knockout plate 124 and the innermost lateral end 115*c* of the cam element seat 115 to increase by a lateral distance equal to the difference between the cam width W and the cam length L. As a further non-limiting example using the aforementioned exemplary configuration, an adjustment of the cam element 125 defined by a rotation of the cam element 125 from the second cam position to the first cam position may cause the lateral distance between the second lateral end 124*b* of the knockout plate 124 and the innermost lateral end 115*c* of the cam element seat 115 to decrease by a lateral distance equal to the difference between the cam width W and the cam length L. As described herein, such a decrease in the lateral distance between the second lateral end 124*b* of the knockout plate 124 and the innermost lateral end 115*c* may correspond to an expansion of the spring element 123 that facilitates a decreased threshold breakaway force (e.g., corresponding to the bias spring force acting on the dynamic protrusion element 122 in the outward lateral direction decreasing as the spring element 123 expands).

In various embodiments wherein the first attachment mechanism 121 includes a knockout plate 124 that is disposed in between the adjustable cam element 125 and the spring element 123 that is configured to bias (e.g., via a corresponding spring force) the dynamic protrusion element 122 in an outward lateral direction towards a locked position, as described herein, the cam element 125 having an asymmetrical configuration such that a first lateral dimension defined by the cam element 125 in the first cam position is less than a second lateral dimension defined by the cam element 125 in the second cam position enables the lateral dimension of the cam element 125 to be selectively adjusted by a user rotating the cam element 125 (e.g., about the central axis 125e) between the first and second cam positions. Such an exemplary reconfiguration of the cam element 125 from the first cam position, as illustrated in FIG. 5A, to the second cam position, as illustrated in FIG. 5B and defined by the cam element 125 exhibiting a lateral dimension that is larger than the corresponding lateral dimension exhibited in the first cam position, may cause the knockout plate 124 to translate in an outward lateral direction (e.g., in the negative z-direction, as defined in the exemplary orientation illustrated in FIGS. 5A and 5B) towards the spring element 123.

In various embodiments, such a reconfiguration of the knockout plate 124 caused by the adjustment of the cam element 125 from a first cam position to the second cam position may cause a lateral pushing force to be transmitted from the first lateral end 124a of the knockout plate 124 to the spring element 123. As illustrated, the spring element 123 may be disposed between the knockout plate 124 (e.g., the first lateral end 124a) and a dynamic protrusion element 122 provided in the locked position such that the outward lateral movement of the knockout plate 124 caused by the reconfiguration of the cam element 125 may result in the compression of the spring element 123. The compression of the spring element 123 may result in an increase in the bias spring force being applied by the spring element 123 to the dynamic protrusion element 122 in the outward lateral direction, thereby resulting in an increased threshold breakaway force. In various embodiments, wherein the threshold breakaway force is defined by the minimum force required to counteract the bias spring force acting on the dynamic protrusion element 122 in the outward lateral direction, as described herein, the first attachment mechanism 121 may be configured such that the additional compression of the spring element 123 resulting from the adjustment of the cam element 125 from the first cam position to the second cam position may correspond to the first attachment mechanism 121 defining an increased threshold breakaway force when the cam element 125 is selectively arranged in the second cam position relative to the threshold breakaway force exhibited by the first attachment mechanism 121 when the cam element 125 is selectively arranged in the first cam position.

Figure 6A:
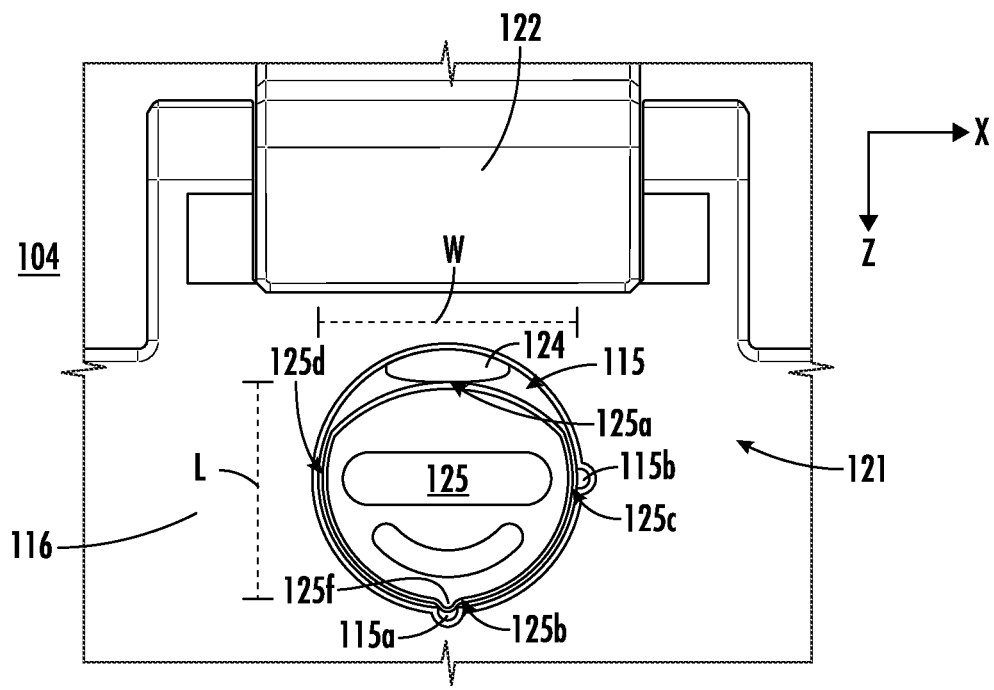
FIGS. 6A and 6B illustrate bottom perspective views of a mounting apparatus with an example attachment mechanism having a dynamic protrusion element configured to facilitate an adjustable threshold breakaway force in accordance with various embodiments of the present disclosure.
Figure 6B:
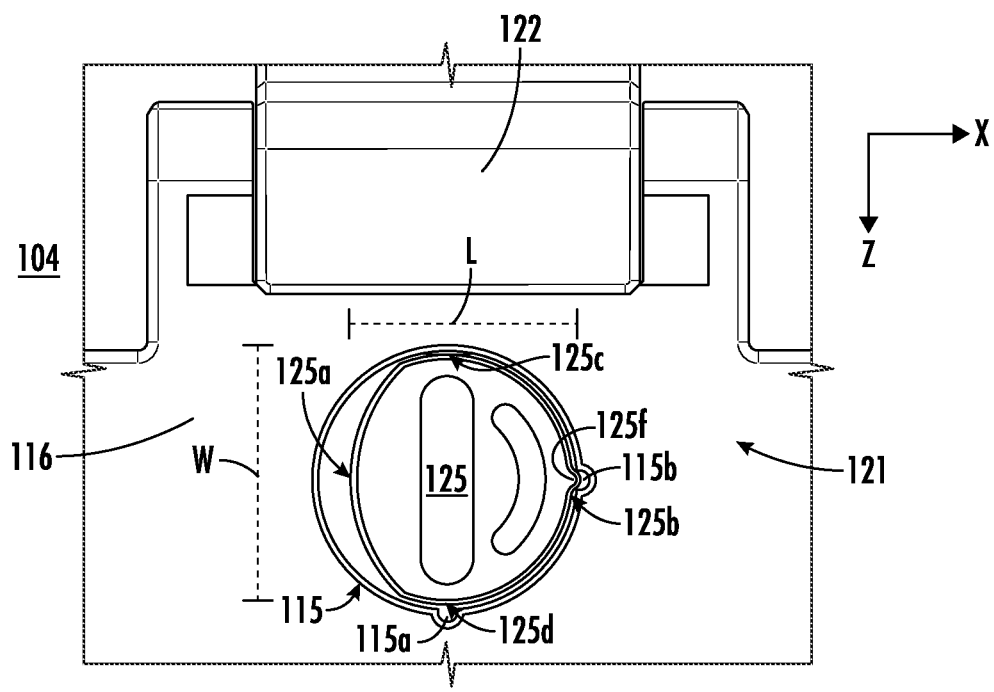

FIGS. 6A and 6B illustrate bottom perspective views of a mounting apparatus with an example attachment mechanism having a dynamic protrusion element configured to facilitate an adjustable threshold breakaway force in accordance with various embodiments of the present disclosure. In particular, FIG. 5A illustrates a first isolated bottom perspective view of a first attachment mechanism 121 comprising a cam element 125 arranged in a first cam position such that the first attachment mechanism 121 defines a first threshold breakaway force, and FIG. 5B illustrates a second isolated bottom perspective view of the first attachment mechanism 121 wherein the cam element 125 is arranged in a second cam position such that the first attachment mechanism 121 defines a second threshold breakaway force that is different than the first threshold breakaway force. In various embodiments, the exemplary embodiments illustrated in FIGS. 6A and 6B may correspond to the exemplary embodiments described herein in reference to FIGS. 5A and 5B, respectively.

In various embodiments, the mounting apparatus 104 may comprise a cam element seat 115 embodying a material recess, an opening, and aperture, and/or the like that is provided along the bottom surface 116 of the mounting apparatus 104 at least substantially proximate the dynamic protrusion element 122 and configured to receive the cam element 125 therein such that the cam element 125 may be accessible to a user for adjustment thereof, as described herein. For example, the cam element seat 115 may embody a material recess having recessed configuration relative to an adjacent portion of the bottom surface 116. The cam element seat 115 may be configured to at least partially (e.g., fully) constrain the linear movement of the cam element 125 while enabling the cam element 125 to rotate within the cam element seat 115 about a central axis thereof (not shown). As illustrated, the cam element seat 115 may have an at least substantially rounded configuration such that the at least partially rounded (e.g., oval-shaped) cam element 125 may rotate therein between a plurality of defined cam positions.

In various embodiments, the cam element seat 115 defines a plurality of cam positioning notches distributed along an outer perimeter of the cam element seat 115, each defining an additional material recess extending radially outward from the outer perimeter of the cam element seat 115 and being configured to receive a position indicator protrusion defined along an outer perimeter of the cam element 125 when the cam element 125 is rotated to a position corresponding to the respective cam positioning notch. For example, as illustrated in FIGS. 6A and 6B, the cam element seat 115 has a rounded outer perimeter with a plurality of cam positioning notches distributed thereabout, including a first cam positioning notch 115a and a second cam positioning notch 115b. As illustrated, each of the cam positioning notches 115a, 115b may have a configuration (e.g., a notch shape, a notch depth, and/or the like) corresponding at least in part to that of the position indicator protrusion 125f defined by the cam element 125, such that each of the cam positioning notches 115a, 115b is configured to receive the position indicator protrusion 125f upon the cam element 125 being rotated to a cam position in which the position indicator protrusion 125f at least substantially overlaps one of the cam positioning notches 115a, 115b. For example, the cam positioning notches 115a, 115b are each configured to receive the position indicator protrusion 125f therein so as to facilitate an at least partial restriction of the cam element 125 from further rotational movement unless intentionally rotated between cam positions (e.g., between cam positioning notches 115a, 115b) by a user. In various embodiments, the first attachment mechanism 121 of an exemplary mounting apparatus 104 may comprise a plurality of cam positioning notches that facilitates the arrangement of the cam element between at least approximately two cam positions and ten cam positions (e.g., between two cam positions and four cam positions), such that the first attachment mechanism 121 defines between two predetermined threshold breakaway forces and ten predetermined threshold breakaway forces (e.g., between two predetermined threshold breakaway forces and four predetermined threshold breakaway forces) between which the first attachment mechanism 121 may be selectively adjusted.

In the exemplary embodiment illustrated in FIGS. 6A and 6B, the cam element seat 115 comprises a plurality of cam positioning notches defined by two cam positioning notches, including a first cam positioning notch 115a and a second positioning notch 115b. In various embodiments, the first attachment mechanism 121 of an exemplary mounting apparatus 104 may be configured such that the cam element 125 is adjustable (e.g., rotatable) between a plurality of cam positions corresponding to the number of cam positioning notches defined by the cam element seat 115. For example, where the exemplary cam element seat 115 depicted in FIGS. 6A and 6B defines a first cam positioning notch 115*a* and a second cam positioning notch 115*b*, the exemplary cam element 125 defined by the first attachment mechanism 121 may be rotatable between a first cam position, as illustrated in FIG. 6A (and described herein in reference to the exemplary arrangement depicted in FIG. 5A) and a second cam position, as illustrated in FIG. 6B (and described herein in reference to the exemplary arrangement depicted in FIG. 5B). In the exemplary configuration, an adjustment of the cam element 125 from the first cam position illustrated in FIG. 6A to the second cam position illustrated in FIG. 6B may be defined by a rotation of the cam element 125 in a counter-clockwise direction (e.g., as defined in the exemplary orientation illustrated in FIGS. 6A and 6B) about the central axis of the cam element 125 (e.g., and/or a central axis defined by the cam element seat 115) through an angle of rotation of at least approximately 90 degrees such that the position indicator protrusion 125*f* is rotated from the first cam positioning notch 115*a* to the second cam positioning notch 115*b*.

as described herein, the cam element 125 may define an asymmetric configuration over one or more axes such that the lateral dimension defined by the cam element 125 is at least substantially different in each of the cam positions defined by the first attachment mechanism 121. FIGS. 6A and 6B illustrate an exemplary cam element 125 having an oval-shaped configuration. As illustrated, the cam element 125 has a cam length L that is defined by the distance of the cam element 125 between the first and second opposing ends 125*a*, 125B and a cam width W that is defined between the third and fourth opposing ends 125*c*, 125*d*. For example, In various embodiments, the cam length L of the cam element 125 is at least substantially smaller than the cam width W. As illustrated in FIG. 6A, an exemplary first cam position may be defined by the cam element 125 being rotated within the cam element seat 115 such that the lateral dimension thereof is defined by the cam length L. Further, as illustrated in FIG. 6B, an exemplary first cam position may be defined by the cam element 125 being rotated within the cam element seat 115 such that the lateral dimension thereof is defined by the cam width W. In such an exemplary configuration, the variance between the cam width W and the cam length L causes the lateral dimension defined by the cam element 125 to change as the cam element 125 is adjusted (e.g., rotated in either a first rotational direction or a second rotational direction) between the first cam position and the second cam position.

As described herein, adjusting the position of the cam element 125 to alter the lateral dimension of the cam element 125 causes the outward lateral pushing force being imparted on the biased dynamic protrusion element 122 from the spring element 123 (e.g., in a direction at least substantially away from the cam element 125) to be similarly affected. For example, the change in the bias spring force being applied to the dynamic protrusion element 122—and thus, the threshold breakaway force defined by the first attachment mechanism 121—may may be selectively increased by adjusting the cam element 125 such that the lateral dimension is increased as the cam element 125 is rotated from a first position to a second position. Additionally, For example, the change in the bias spring force being applied to the dynamic protrusion element 122—and thus, the threshold breakaway force defined by the first attachment mechanism 121—may be selectively decreased by adjusting the cam element 125 such that the lateral dimension is decreased as the cam element 125 is rotated from a first position to a second position. In various embodiments, the change in the bias spring force acting on the dynamic protrusion element 122 may correspond at least in part to the difference between an initial lateral dimension and a present lateral dimension defined by the cam element 125 in an initial cam position and present cam position, respectively. As an illustrative example, the cam element 125 being arranged in the first cam position such that the lateral dimension defined by the cam element 125 is defined by the shorter cam length L may correspond to a first threshold breakaway force defined by the first attachment mechanism 121 that is at least substantially less than a second threshold breakaway force exhibited when the cam element 125 is in the second cam position such that the lateral dimension is defined by the longer cam width W, as illustrated in FIG. 6B.

As illustrated, in an exemplary configuration wherein the cam element 125 has a cam width W that is greater than a cam length L, the cam width W may span the full diameter of the cam element seat 115 while a radial gap is defined between the first cam element end 115*a* and the outer perimeter of the cam element seat 115. For example, as illustrated in FIG. 6A, the cam element 125 being positioned in a first cam position may be defined by the position indicator protrusion 125*f* being disposed in the first cam positioning notch 115*a* and at least a portion of the knockout plate 124 being disposed within radial gap between the first cam element end 115*a* and an outermost lateral end of the cam element seat 115.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A mounting apparatus for securing a wearable device, the mounting apparatus comprising:
    an attachment assembly configured to operably engage the wearable device to secure the wearable device in a detachable configuration relative to the mounting apparatus, the attachment assembly comprising:
    a first attachment mechanism comprising a dynamic protrusion element configured to operably engage a first portion of the wearable device, the first attachment mechanism further comprising a spring element, a knockout plate, and a cam element, the first attachment mechanism being configured to facilitate a detachment of the wearable device from the attachment assembly upon a separation force that is greater than or equal to a threshold breakaway force being applied to the dynamic protrusion element;
    wherein the spring element is arranged between the dynamic protrusion element and the knockout plate such that the spring element is configured to apply a variable spring force to the dynamic protrusion element in a first lateral direction at least substantially away from the knockout plate, and
    wherein the first attachment mechanism is selectively configurable between a first configuration and a second configuration to facilitate a selective adjustment of the threshold breakaway force defined by the first attachment mechanism.

2. The mounting apparatus of claim 1, wherein the dynamic protrusion element defines a dynamic configuration defined being laterally moveable between a locked position and a release position based at least in part on one or more forces acting on the dynamic protrusion element via the wearable device.

3. The mounting apparatus of claim 1, wherein the variable spring force applied to the dynamic protrusion element by the spring element embodies a bias spring force configured to bias the dynamic protrusion element in the first lateral direction, wherein the first lateral direction defines an outward lateral direction such that, upon the wearable device being secured to the mounting apparatus, the dynamic protrusion element is biased towards the first portion of the wearable device.

4. The mounting apparatus of claim 1, wherein the threshold breakaway force is defined at least in part by the variable spring force being imparted on the dynamic protrusion element.

5. The mounting apparatus of claim 4, wherein the first attachment mechanism is selectively configurable between at least three configurations corresponding to the threshold breakaway force defined by the first attachment mechanism being selectively adjustable between at least three predetermined threshold breakaway forces.

6. The mounting apparatus of claim 5, wherein the first attachment mechanism being selectively configurable between the at least three configurations is defined by the cam element being configurable at least between a first cam position, a second cam position, and a third cam position.

7. The mounting apparatus of claim 4, wherein the first attachment mechanism is configured such that the variable spring force varies based at least in part on a cam position defined by the cam element.

8. The mounting apparatus of claim 7, wherein the cam element is configured for rotation about a central axis thereof such that the cam position of the cam element is defined by angular position relative to the central axis.

9. The mounting apparatus of claim 8, wherein the cam element comprises an at least partially rounded outer perimeter defined by an asymmetrical shape as measured over one or more perpendicular axes spanning opposing ends of the cam element such that a rotation of the cam element between a first cam position and a second cam position corresponds a changed in a lateral dimension defined by the cam element.

10. The mounting apparatus of claim 9, wherein the lateral dimension is defined in the first lateral direction between an innermost lateral end of the knockout plate and an innermost edge of a cam element seat within which the cam element is secured.

11. The mounting apparatus of claim 1, further comprising a second attachment mechanism configured to operably engage a second portion of the wearable device.

12. The mounting apparatus of claim 11, wherein the attachment assembly is configured such that the detachable configuration of the wearable device relative to the mounting apparatus facilitates the detachment being defined by one or more of a breakaway detachment defined the dynamic protrusion element of the first attachment mechanism being rearranged from a locked position to a release position based at least in part on one or more forces acting on the dynamic protrusion element via the wearable device and a user-initiated detachment defined by a user actuation of a release button defined by the second attachment mechanism.

13. The mounting apparatus of claim 1, wherein the mounting apparatus further comprises a plurality of fasteners configured to form a plurality of operable attachment points configured to engage a strap.

14. The mounting apparatus of claim 1, wherein the dynamic protrusion element comprises an at least partially curved apparatus surface, and wherein the first portion of the wearable device is defined at least in part by a corresponding curved device surface having a curvature that corresponds to the at least partially curved apparatus surface.

15. The mounting apparatus of claim 14, wherein the at least partially curved apparatus surface is arranged so as to face in an at least partially outward lateral direction.

16. A wearable device mounting system, the wearable device mounting system comprising:
   a wearable device comprising a receptor and an orifice defined by one or more guide surfaces;
   a mounting apparatus for securing the wearable device, the mounting apparatus comprising:
      an attachment assembly configured to operably engage the wearable device to secure the wearable device in a detachable configuration relative to the mounting apparatus, the attachment assembly comprising:
         a first attachment mechanism comprising a dynamic protrusion element configured to operably engage at least a portion of the one or more guide surfaces defined by the wearable device, the first attachment mechanism being configured to facilitate a detachment of the wearable device from the attachment assembly upon a separation force that is greater than or equal to a threshold breakaway force being applied to the dynamic protrusion element,
         wherein the first attachment mechanism further comprises a spring element, a knockout plate, and a cam element, wherein the spring element is arranged between the dynamic protrusion element and the knockout plate such that the spring element is configured to apply a variable spring force to the dynamic protrusion element in a first lateral direction at least substantially away from the knockout plate;
         wherein the first attachment mechanism is selectively configurable between a first configuration and a second configuration to facilitate a selective adjustment of the threshold breakaway force defined by the first attachment mechanism.

17. The wearable device mounting system of claim 16, wherein the dynamic protrusion element defines a dynamic configuration defined being laterally moveable between a locked position and a release position based at least in part on one or more forces acting on the dynamic protrusion element via the wearable device.

18. The wearable device mounting system of claim 16, wherein the variable spring force applied to the dynamic protrusion element by the spring element embodies a bias spring force configured to bias the dynamic protrusion element in the first lateral direction, wherein the first lateral direction defines an outward lateral direction such that, upon the wearable device being secured to the mounting apparatus, the dynamic protrusion element is biased towards a first portion of the wearable device, and wherein the threshold breakaway force is defined at least in part by the variable spring force being imparted on the dynamic protrusion element.

* * * * *